United States Patent [19]

Kannapell et al.

[11] Patent Number: 4,593,325
[45] Date of Patent: Jun. 3, 1986

[54] ADAPTIVE THRESHOLD DOCUMENT DUPLICATION

[75] Inventors: Henry N. Kannapell, Raleigh, N.C.; Thomas W. Bobick, Richardson, Tex.

[73] Assignee: The Mead Corporation, Dayton, Ohio

[21] Appl. No.: 642,016

[22] Filed: Aug. 20, 1984

[51] Int. Cl.⁴ .............................................. H04N 1/40
[52] U.S. Cl. ....................................... 358/282; 382/50
[58] Field of Search ............... 358/282, 283, 280, 293; 382/50, 51, 52, 53; 340/347 AD

[56] References Cited

U.S. PATENT DOCUMENTS

| | | | |
|---|---|---|---|
| 3,159,815 | 12/1964 | Groce | 382/53 |
| 3,294,896 | 12/1966 | Young, Jr. | 358/260 |
| 3,479,642 | 11/1969 | Bartz | 382/50 |
| 3,534,334 | 10/1970 | Bartz et al. | 382/50 |
| 3,723,649 | 3/1973 | Pitegoff et al. | 358/282 |
| 4,258,393 | 3/1981 | Ejiri et al. | 358/282 |
| 4,339,774 | 7/1982 | Temple | 358/283 |
| 4,345,314 | 8/1982 | Melamud et al. | 358/282 |
| 4,349,846 | 9/1982 | Sekigawa | 358/283 |
| 4,409,623 | 10/1983 | Kobayashi et al. | 358/261 |
| 4,468,703 | 8/1984 | Fujiwara et al. | 382/51 |
| 4,468,704 | 8/1984 | Stoffel et al. | 358/282 |
| 4,496,987 | 1/1985 | Yuasa et al. | 358/283 |
| 4,509,195 | 4/1985 | Nadler | 382/51 |
| 4,547,811 | 10/1985 | Ochi et al. | 358/283 |

Primary Examiner—James J. Groody
Assistant Examiner—Edward L. Coles
Attorney, Agent, or Firm—Biebel, French & Nauman

[57] ABSTRACT

An adaptive threshold for processing grayscale image data obtained by scanning a document to be duplicated is set by initially dividing the data into data groups representative of selected pixels of the document. A background grayscale value and a print grayscale value are determined for each data group with the difference between the two defining a contrast grayscale value. An estimated threshold is calculated by adding 0.4 of the contrast to the background. An average threshold is also determined for the area of each data group by averaging the thresholds for contiguous data groups for which thresholds have been established. The adaptive threshold is determined for each data group by setting the adaptive threshold to the average threshold +1 if the estimated threshold exceeds the average threshold; to the average threshold −1 if the estimated threshold is less than the average threshold; and, to the average threshold otherwise. The grayscale image data for each data group is compared to its corresponding adaptive threshold to generate binary data which drives a printer to substantially duplicate the document.

12 Claims, 12 Drawing Figures

ADAPTIVE THRESHOLD DOCUMENT DUPLICATION

BACKGROUND OF THE INVENTION

The present invention relates generally to processing image data obtained, for example, by scanning a picture, document or other image, and more particularly, to a method and apparatus for duplicating an image wherein grayscale image data is compared to a threshold to convert the grayscale image data to binary image data which controls an image printer.

Grayscale image data is obtained by scanning an image with a suitable device, for example, a scanner comprising a plurality of charge-coupled devices (CCD's). The scanner effectively divides the image into a finite number of small picture elements referred to as pels or pixels. Each pixel of a scanned image is converted into a number representative of the grayscale value of the pixel as detected by a CCD scanner cell.

If the image is to be applied to a bilevel device, i.e., a device which reproduces each pixel as one of two grayscale values, the grayscale value of each pixel is converted to a binary number signifying which of the two grayscale values will represent the pixel. For a bilevel image duplication device, the two grayscale values are black or white and correspond to print or no print picture elements, respectively.

The determination of which pixels are to be printed or left not printed for duplication of a given image depends to some extent on the characteristics of the image. For example, portions of the image may be classified as continuous tone or text. Photographs and certain half tone images are examples of continuous tone while text is exemplified by line drawings and letter images.

While the grayscale image data may be processed in a variety of ways, the conversion from grayscale data to binary data is often accomplished by establishing a threshold to which the grayscale value of each pixel is compared. The result of the comparison is that if the grayscale value exceeds the threshold, a black or print representation is selected for the pixel and conversely, if the threshold is not exceeded, the pixel is left white or not printed. This thresholding technique is particularly satisfactory for the processing of text image data.

Fixed thresholds may be used for the conversion of grayscale image data to binary image data. However, fixed threshold comparisons do not accommodate images which have varying contrasts, i.e., images which are lighter or darker relative to one another. Histogram analysis has been applied to overcome such problems and account for darkness variations between images; however, such analyses are typically computationally demanding and tend to be avoided.

Accordingly, it has been found useful to provide threshold values that vary to be representative of the average grayscale value in a small region in the vicinity of a pixel being evaluated. Techniques are known which employ both analog circuitry, such as integrating capacitors, and digital circuitry, such as digital low-pass filters, for the explicit calculation of averages of adjacent pixel grayscale values. An implicit determination of average grayscale values of surrounding pixels by means of columnar and horizontal accumulations of grayscale values or reflectances for image pixels is also disclosed in U.S. Pat. No. 4,345,314.

While these prior art arrangements provide varying levels of effectiveness for different situations, improved techniques for generating adaptive grayscale image data thresholds are always needed to advance the art of image duplication and provide attractive and inexpensive alternatives.

SUMMARY OF THE INVENTION

In accordance with the present invention, an adaptive threshold is determined to which grayscale image data is compared to convert the grayscale image data to binary image data suitable for use in a bilevel printing device. Grayscale image data is obtained by scanning a picture, document or other image. The grayscale image data is divided into groups of data representative of selected pixels of the image. A background grayscale value and a print grayscale value are determined for each group of image data. A contrast grayscale value is determined for each group by subtracting the background grayscale value from the print grayscale value.

An estimated threshold is then determined for each group by adding a defined fractional portion of the contrast grayscale value to the background grayscale value. It has been found that the estimated threshold for an image data group is best determined by summing the background grayscale value of the group with 0.4 of the contrast value of the group.

An average threshold for the area of each image data group is determined by averaging the thresholds for image data groups contiguous thereto for which thresholds have been previously established. The adaptive threshold is then determined by comparing the estimated threshold to the average threshold and selecting a threshold for the image data group within a defined band surrounding the average threshold based on the estimated threshold. The image data for each group is then compared to the corresponding image data group threshold thus determined. If the image data exceeds the threshold, the pixel will be printed to duplicate the image. If the image data does not exceed the threshold, the pixel will not be printed.

The background and print grayscale values for each image data group are preferably determined as the data is received. A maximum possible background grayscale value is initially stored for an image data group, the grayscale value of each element of the group is then compared to the maximum background grayscale value and the background grayscale value for the group is updated to the grayscale value of an element of the group if the grayscale value of the element of the group is less than the currently stored background grayscale value. In this way, the background grayscale value, which is ideally a grayscale of zero (white), is determined for each image data group.

Similarly, the print grayscale value for each image data group is determined by initially storing a minimum print grayscale value as the print grayscale value for an image data group. The grayscale value of each element of the group is then compared to the minimum print grayscale value and the print grayscale value for the group is updated to the grayscale value of an element of the group if the grayscale value of the element exceeds the currently stored print grayscale value. In this way, the print grayscale value tends toward the maximum black grayscale value of the image, for example, ideally a grayscale of 15 (black) for a system including 16 grayscale values varying from 0 (white) to 15 (black).

The image data to be thresholded is organized preferably as a matrix with each row of the matrix being divided into a plurality of segments with each segment comprising a plurality of pixels. The image data groups then each comprise one of the matrix row segments. It has been found that the threshold band surrounding the average threshold for each image data group is preferably defined by the average threshold ±1. Hence, the adaptive threshold for each group is determined by setting the group threshold to the average threshold +1 if the estimated threshold exceeds the average threshold; to the average threshold −1 if the estimated threshold is less than the average threshold; and, to the average threshold otherwise. The adaptive threshold, so determined, may be used in a dot matrix document copier for controlling print/no print divisions. It is particularly useful for reproduction of text information, but can also be used for reproduction of other types of images.

It is, therefore, an object of the present invention to provide an improved method and apparatus for duplicating a document including the generation of an adaptive threshold to which grayscale image data is compared to convert the grayscale image data to binary image data wherein the grayscale image data is divided into large data groups, an estimated threshold is determined for each group by summing a background grayscale value with a defined fractional portion of a contrast grayscale value for the group, the estimated threshold is then compared to an average threshold determined by averaging previously calculated thresholds for groups contiguous to the image data group to set the adaptive threshold within a defined band surrounding the average threshold.

Other objects and advantages of the invention will be apparent from the following description, the accompanying drawings and the appended claims.

DETAILED DESCRIPTION OF THE INVENTION

Figure 1:
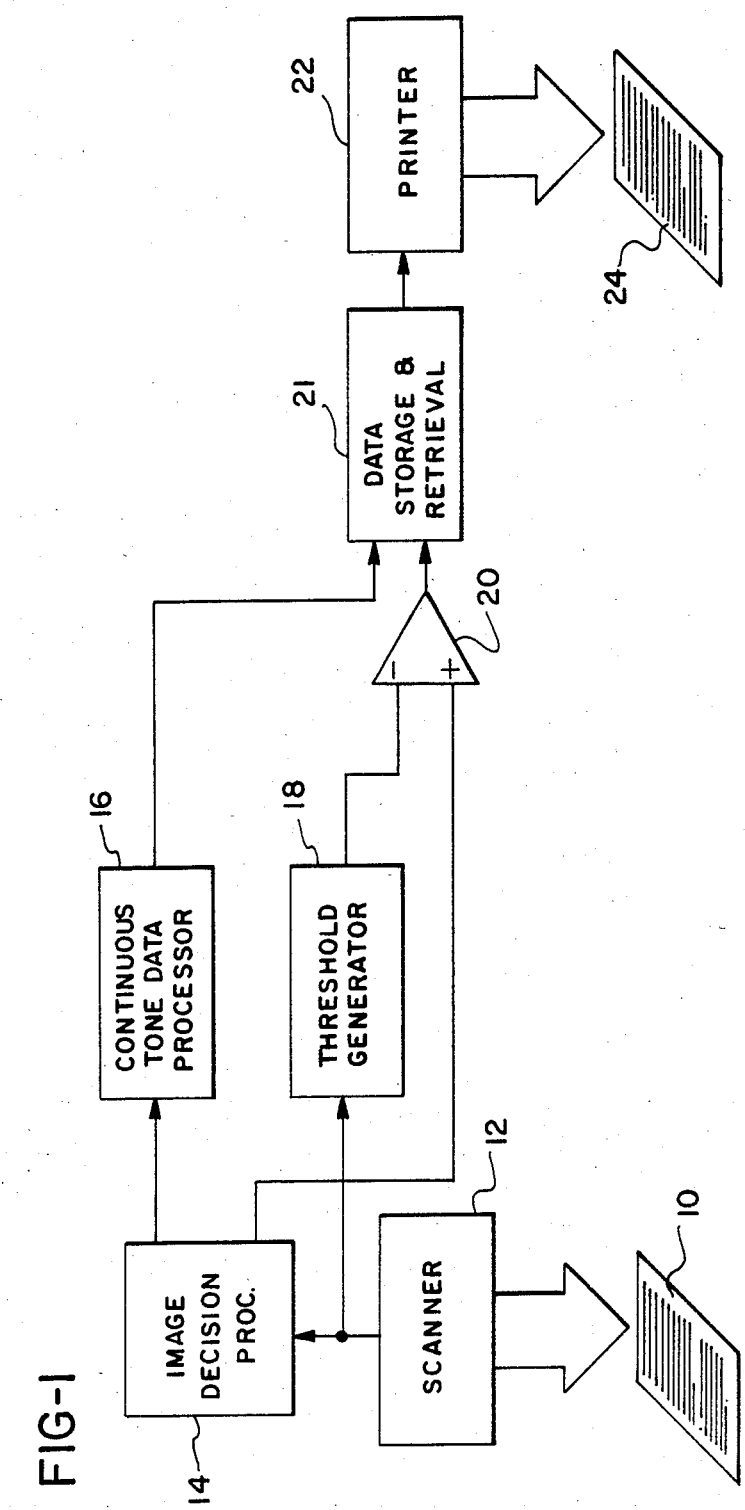
FIG. 1 is a block diagram of a document duplicator system.

While the present invention is generally applicable to processing grayscale image data, it will be described with reference to processing text image data in a document duplicator system as shown in FIG. 1 for which it is particularly applicable. In such a system, a document 10 to be duplicated is scanned by a document scanner 12 which may comprise any commercially available CCD array, for example, a CCD 151 scanning array sold by Fairchild Camera & Instrument Corporation. Scanner 12 includes an analog-to-digital converter which converts each pixel of the document 10 into a grayscale value ranging between white and black, for example, grayscale value 0 and grayscale value 15, respectively, if 16 grayscale values are used.

The grayscale image data is passed from the scanner 12 to an image decision processor 14 which determines whether the data corresponds to text or continuous tone portions of the document 10. A suitable image decision processor is fully disclosed in the U.S. patent application entitled "Text/Continuous Tone Image Decision Processor" which was filed on even date herewith, is assigned to the same assignee as the present application and is incorporated herein by reference.

Continuous tone image data is passed to a continuous tone data processor 16 which determines which pixels should be printed by a printer 22 to generate a copy 24 which duplicates continuous tone portions of the document 10. A variety of processing techniques can be applied to the continuous tone data. For example, various pixel block patterns can be selected to represent the data. Also, the block patterns may be shifted, rotated or otherwise varied to prevent the appearance of interference patterns. Since these techniques are not a part of the present invention, they will not be further described herein.

The grayscale image data representative of the document 10 is passed to a threshold generator 18 and grayscale image data representative of text portions of the document 10 is passed to one input of a comparator circuit 20. An adaptive threshold generated by the threshold generator 18 is passed to the other input of the comparator circuit 20. The text image data is compared to the adaptive threshold to determine which pixels should be printed by the printer 22 and which pixels should not be printed to duplicate text portions of the document 10. If the grayscale values of the text image data exceed the threshold, the corresponding pixels are printed; if they do not exceed the threshold, they are not printed. By utilizing the adaptive threshold, a document duplicator automatically adjusts to documents having varying grayscale values, i.e., documents which are lighter or darker relative to one another.

Data from the continuous tone data processor 16 and the comparator circuit 20 are passed to a data storage and retrieval circuit 21. While the data storage and retrieval circuit 21 forms no part of the present invention, an applicable circuit is disclosed in U.S. patent application Ser. No. 355,781, which was filed by Bobick et al. on Mar. 8, 1982, and is assigned to the same assignee as the present application. Data within the data storage and retrieval circuit 21 is then passed to the printer 22 to print a copy 24 which duplicates the document 10. The printer 22 is preferably a jet drop printer of the type disclosed in Paranjpe, U.S. Pat. No.

4,085,409, but any convenient binary marking apparatus could be used.

Figure 2:
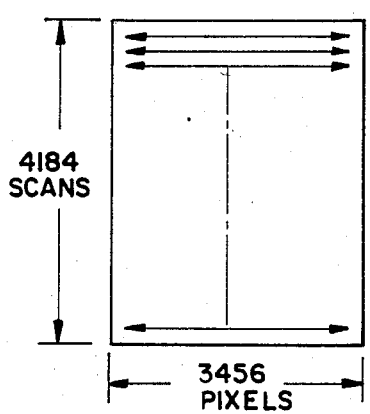
FIG. 2 is a diagram illustrating the organization of the image data corresponding to a page of scanned pixels.

The grayscale image data which is generated by scanning the document 10 to be duplicated is formed into a matrix of pixel grayscale values or words. Presuming an 8½×11 inch document with approximately 380 pixels per inch, the matrix comprises 3,456 pixel grayscale words per row with 4,184 rows or scan lines as shown in FIG. 2. The grayscale values corresponding to each of the individual pixels range from 0 for white to 15 for black in a 16 grayscale value implementation.

A single scan line is defined as the set of pixel grayscale words located along one horizontal row which corresponds to 3,456 horizontal pixels by one scan vertical area. The data is processed by the duplicator system one scan line at a time from the top of the page to the bottom.

Figure 3:
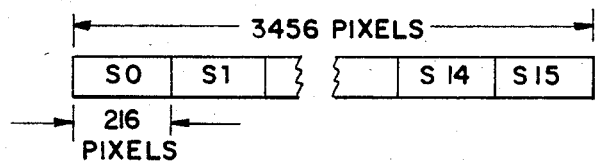
FIG. 3 shows the segmentation of a row of the image data of FIG. 2 to form image data groups in accordance with one embodiment of the present invention.

Each scan line is divided into 16 segments S0-S15 with each segment comprising 216 grayscale words corresponding to 216 pixels as illustrated in FIG. 3. An adaptive threshold is generated for each of the individual segments of the document and these thresholds are used to determine whether individual pixels of the corresponding segments will be printed or not printed in the event the pixels are identified as comprising text portions of the image. As previously noted, the thresholds can be generally applied to the grayscale data; however, it is most effective for processing text data.

A segment adaptive threshold is based upon the threshold values previously determined for the segment immediately preceding the segment being processed in the same scan line and the segment immediately above the segment being processed, i.e., the corresponding segment of the preceding scan line, as will be described. Accordingly, the threshold values for the segments of the first scan line and the leading segments of all of the scan lines of a matrix of grayscale image data need to be initially assigned or otherwise estimated such that the adaptive threshold for the remaining segments of image data can be determined.

A variety of estimates can be made, such as setting the threshold of the initial segment of a scan line equal to the threshold of the next adjacent segment of the preceding scan line. However, it is preferred to set the thresholds of the segments of the initial scan line as well as the initial segment of each of the scan lines to a value of 7 for an implementation having 16 grayscale values. The selected threshold value of 7 is approximately intermediate between the lowest and highest grayscale values which may be encountered in the matrix of grayscale values corresponding to the document 10 and serves as a bias for the adaptive threshold of an entire document.

Initially, a print grayscale value and a background grayscale value are determined for each segment. Due to the possibilities of document misregistration and other horizontal border uncertainties, the threshold values for the first and last scan line segments, S0 and S15, are not actually calculated, but are set equal to the threshold values for segments S1 and S14, respectively. Thus, while an initial threshold value of 7 is assumed for segment S0 of each scan line to calculate the threshold value of segment S1, once the threshold value of S1 has been calculated, the threshold value for segment S0 is updated to the threshold value of segment S1. The update procedure for segment S0 of a scan line is shown graphically in FIG. 7.

The print grayscale value is defined as the blackest print level in a segment or the highest numbered grayscale value. The print grayscale value is determined by initially setting the print grayscale value to white or to a grayscale value of zero and then comparing the grayscale value representative of each pixel of a segment to the stored print grayscale value. If the grayscale value of a pixel in the segment is greater than the stored print grayscale value, then the print grayscale value is updated to the grayscale value of the corresponding pixel of the segment. Thus, the print grayscale value for a given segment is adjusted to the blackest print level in the segment.

Figure 4:
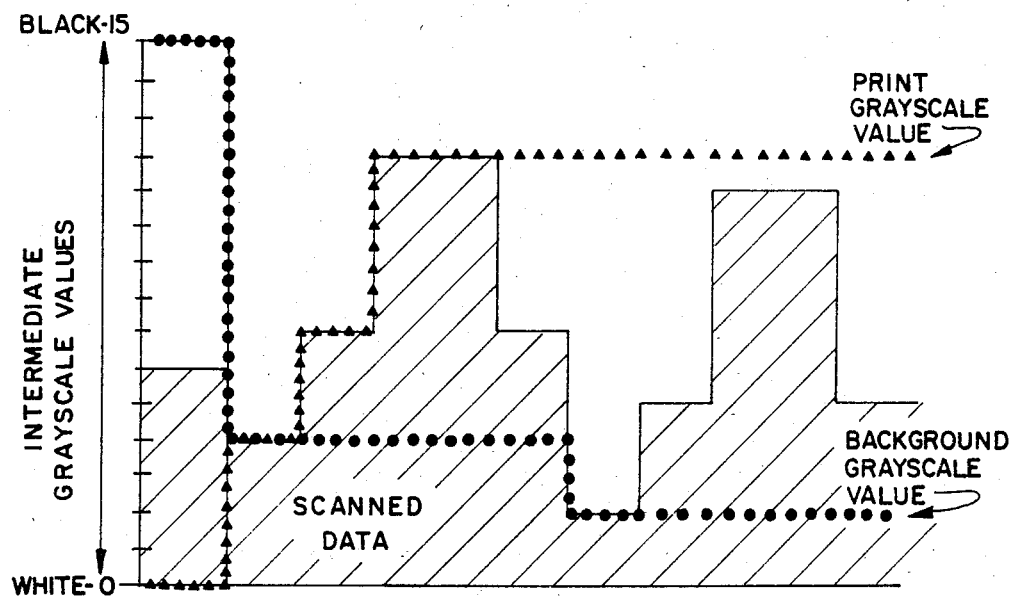
FIG. 4 is a graph showing the generation of background grayscale values and print grayscale values for image data groups.

The background grayscale value is defined as the whitest print level in a segment or the lowest numbered grayscale value. The background grayscale value is determined by initially setting the background grayscale value to the blackest print level or to a grayscale value of 15 for a 16 grayscale value system. The grayscale value of each pixel of a segment is then compared to the stored background grayscale value. If the grayscale value of a pixel of the segment is less than the stored background grayscale value, the background grayscale value is updated to the grayscale value of the corresponding pixel of the segment. Thus, the background grayscale value is adjusted to the lightest print level in the segment. An exemplary graphical representation of the determination of the background grayscale value and the print grayscale value for the beginning of a scan line segment is shown in FIG. 4.

A contrast grayscale value is determined for each segment by subtracting the background grayscale value for the segment from the print grayscale value, both of which are determined as just described. In the event that the contrast grayscale value for a segment is sufficiently large, for example, greater than 4, an estimated threshold is determined. On the other hand, if the contrast is small, for example, less than or equal to 4, no estimate is made. For small contrast values, it is presumed that insufficient information is contained within the segment on which to base an estimated threshold.

Figure 5:
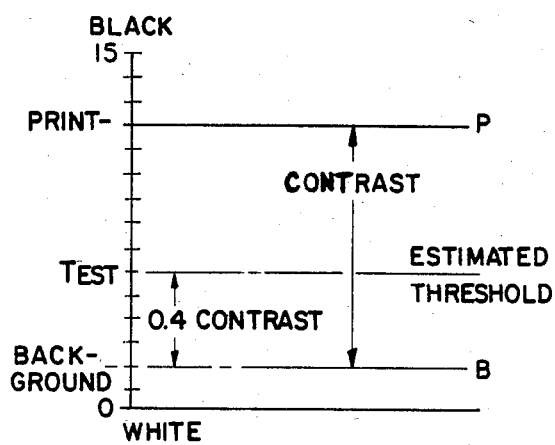
FIG. 5 shows graphically the determination of an estimated threshold for an image data group.

If the contrast grayscale value for a segment is greater than 4, the estimated threshold is determined by adding a fractional portion of the contrast grayscale value C to the background grayscale value B. It has been found that a preferred estimated threshold is determined by adding 0.4 of the contrast grayscale value to the background grayscale value. The estimated threshold calculation is shown graphically in FIG. 5 and is represented by the following equation:

$$T_{EST} = B + 0.4C$$

A threshold value for properly processing the grayscale pixel values contained within a scan line segment should be close to the threshold values for segments contiguous thereto. In accordance with the present invention, contiguous segments for which a threshold has already been calculated are combined to determine an average threshold value for the area of the segment being evaluated.

Figure 6:
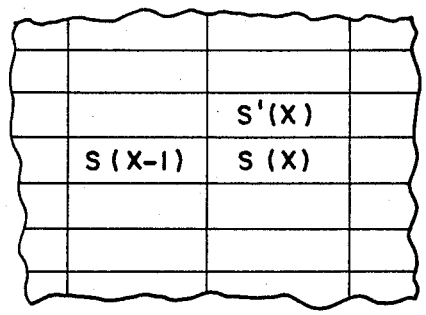
FIG. 6 shows an image data group and the two image data groups contiguous to it for which adaptive thresholds have previously been determined.

Thus, an average threshold is determined by taking the threshold value of the immediately preceding segment $S(X-1)$ in the same scan line and the corresponding segment $S'(X)$ in the immediately preceding scan line, adding the two thresholds together and dividing by 2. The segments referred to are shown in FIG. 6 and the average threshold calculation is represented by the equation:

$$T_{AVG}[S(X)] = \frac{T[S(X-1)] + T[S'(X)]}{2}$$

The threshold value for a segment being processed is then set within the range of the average threshold ±1. Thus, based upon the value of the estimated threshold, the final adaptive threshold in accordance with the present invention is set equal to the average threshold +1 if the estimated threshold is greater than the average threshold; the average threshold −1 if the estimated threshold is less than the average threshold; or, the average threshold otherwise.

Figure 7:
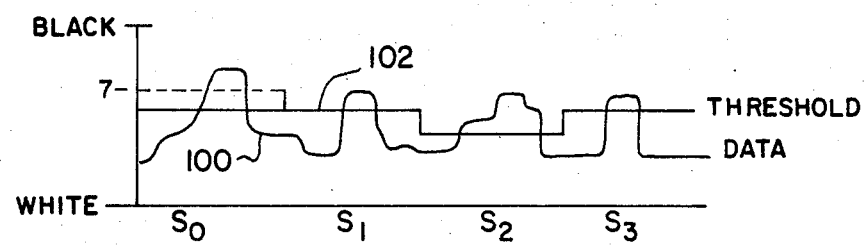
FIG. 7 is a graph showing scanned image data and the corresponding adaptive thresholds generated in accordance with the present invention.
Figure 8:
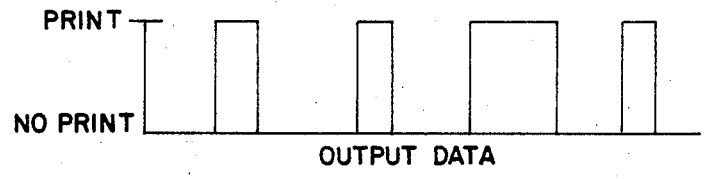
FIG. 8 shows binary image data generated by applying the adaptive thresholds of FIG. 7.

FIG. 7 shows scanned data 100 and the corresponding adaptive thresholds 102 generated in accordance with the present invention. FIG. 8 shows binary image data generated by comparing the grayscale values of pixels of several segments with the adaptive thresholds established in accordance with the present invention for the segments.

Figure 9:
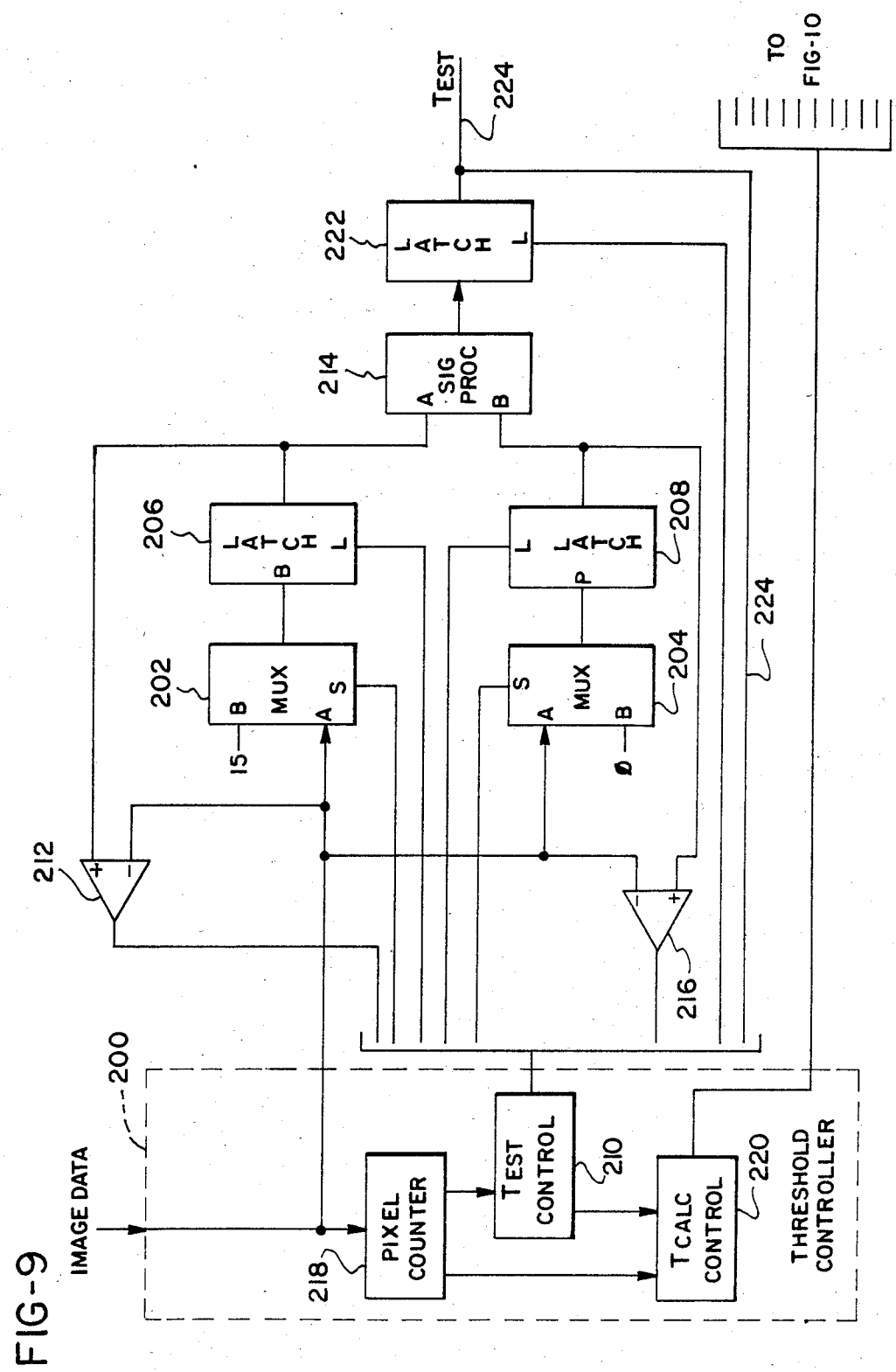
FIGS. 9 and 10 form a schematic block diagram of an illustrative implementation for generating adaptive thresholds in accordance with the present invention.
Figure 10:
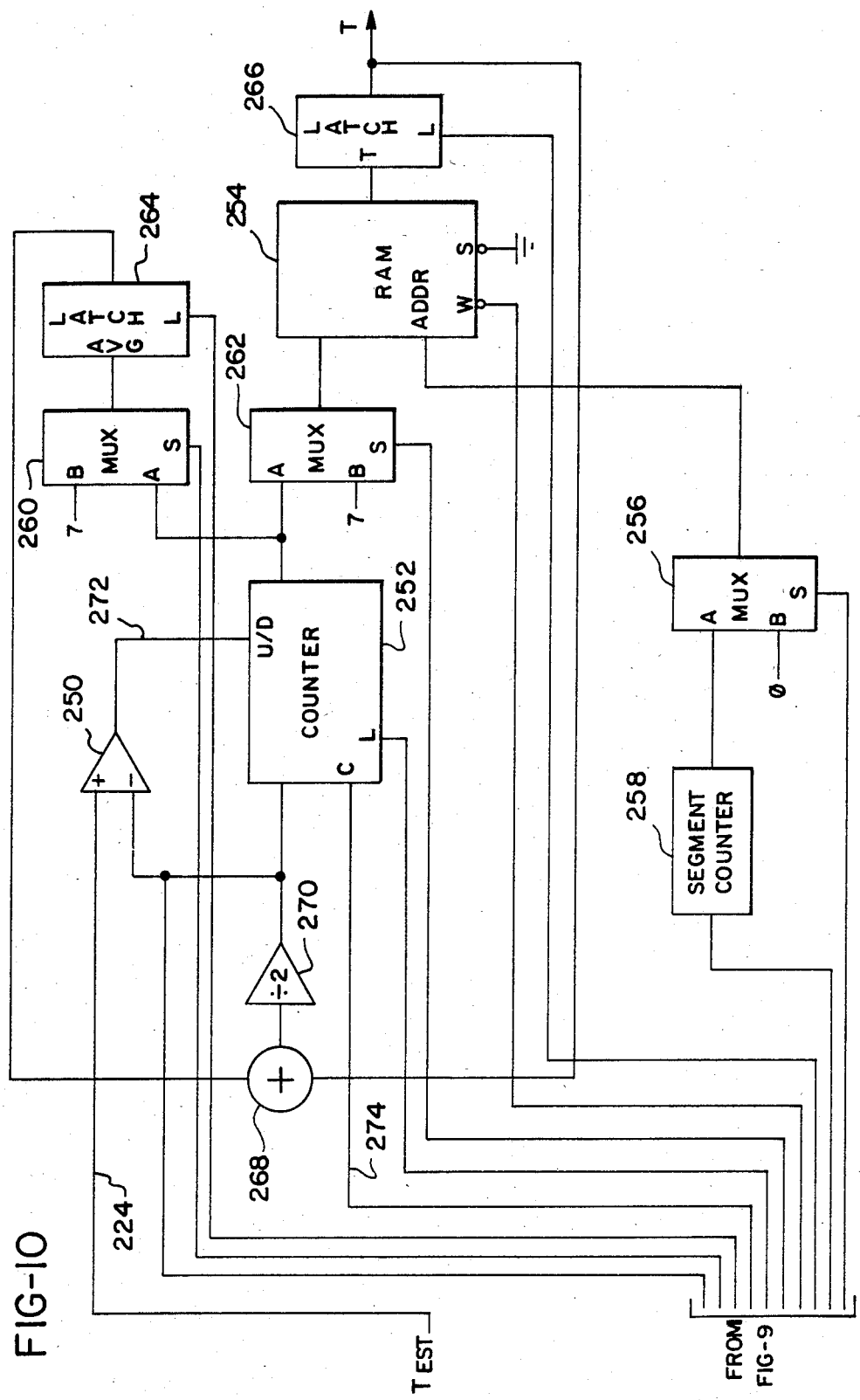

FIGS. 9 and 10 form a schematic block diagram for generating adaptive thresholds in accordance with the present invention as described above. Grayscale image data signals are passed to a threshold controller 200 on a scan line by scan line basis. The image data is passed to multiplexers 202 and 204 which form part of the circuitry, respectively, for generating the background grayscale value and the print grayscale value for incoming scan line segments.

The output of the multiplexer 202 is connected to a background B latch circuit 206 and the output of the multiplexer 204 is connected to a print P latch circuit 208. A threshold estimate control circuit 210 contained within the threshold controller 200 initially selects the signals on the B inputs of the multiplexers 202 and 204. The B input signals, 15 and 0, are latched into the latch circuits 206 and 208, rspectively. The threshold estimate controller 200 then selects the A inputs of the multiplexers 202 and 204.

The output signals from the latch circuit 206 are passed to the positive input of a comparator circuit 212 and also to the A input of a signal processing circuit 214. The output signals from the latch circuit 208 are passed to the positive input of a comparator circuit 216 and also to the B input of the signal processing circuit 214. The input image data is passed to the negative input of the comparator circuits 212 and 216.

Individual pixels (0–215) of the incoming image data are counted by a pixel counter 218 contained within the threshold controller 200. Output signals from the pixel counter 218 are passed to the threshold estimate control circuit 210 and a threshold calculation control circuit 220. The pixel counter 218 defines the scan line segments such that the threshold estimate control circuit 210 and the threshold calculation control circuit 220 may properly control the circuitry of FIGS. 9 and 10 to generate the adaptive threshold.

Since the maximum grayscale value of 15 was stored into the latch circuit 206, a grayscale value of 15 is provided to the positive input of the comparator circuit 212 and the incoming image data is applied to the negative input of the comparator circuit 212. If the grayscale value of a word of input image data is less than the background grayscale value stored in the latch circuit 206, a background update signal is generated by the comparator circuit 212 and passed to the threshold estimate control circuit 210. The threshold estimate control circuit 210, in response to the background update signal, stores the image data word into the latch circuit 206 to update the background grayscale value to the grayscale value of the image data word.

In a similar manner, the lowest grayscale value of zero was stored in the latch circuit 208 and passed to the positive input of the comparator circuit 216. The input image data is also applied to the negative input of the comparator circuit 216. If the grayscale value of a word of input image data is greater than the grayscale value stored in the latch circuit 208, a print update signal is generated by the comparator circuit 216 and passed to the threshold estimate control circuit 210. The threshold estimate control circuit 210, in response to the print update signal, stores the image data word into the latch circuit 208 to update the print grayscale value to the grayscale value of the image data word.

After the entire 216 pixels of a scan line segment have been processed, i.e., the pixel counter 218 contains a count of 215, the background grayscale value will be contained in the latch circuit 206 and the print grayscale value will be contained in the latch circuit 208. The signal processing circuit 214 then determines the estimated threshold $T_{EST}$ from the background and print grayscale values. The background grayscale value on the A input of the signal processing circuit 214 is subtracted from the print grayscale value on the B input of the circuit to determine the contrast grayscale value for the segment. The contrast grayscale value obtained is compared to 4. If the contrast grayscale value is greater than 4, it is multiplied by 0.4 and added to the background grayscale value to obtain the estimated threshold $T_{EST}$ which is then stored in a latch circuit 222.

On the other hand, if the contrast grayscale value is less than or equal to 4, an output value of 15 (hexadecimal F) is stored in the latch circuit 222. In either event, the output signals from the signal processing circuit 214 are latched into the latch circuit 222 and provided as the threshold estimate on conductors 224 which pass to the circuitry of FIG. 10 and also to the threshold estimate control circuit 210. While the signal processing circuit 214 can be implemented by means of a variety of circuitry, it is preferably implemented as a programmable read-only memory (PROM) which is addressed by the input signals on the A and B inputs. Each possible combination of the signals on the A and B inputs of the circuit 214 can thus be used to address unique locations within a PROM. The data stored at those locations then is the value obtained by the operations just described or a value of 15 (hexidecimal F) if no estimate is to be made.

Since an estimated threshold value of 15 (hexadecimal F) cannot be generated for a contrast value greater than 4, this signal indicates that no estimated threshold was determined for the segment. This information is passed by the threshold estimate control circuit 210 and to the threshold calculation control circuit 220 for reasons which will become apparent upon an understanding of the operation of the block diagram of FIG. 10 which will now be described.

The estimated threshold $T_{EST}$ for a scan line segment as contained within the latch circuit 222 is passed to the positive input of a comparator circuit 250 via the conductors 224. The output signal from the comparator circuit 250 is passed to an up/down input of a counter circuit 252. The counter circuit 252 is used to increment, decrement or pass a calculated average threshold for a segment as will be described.

A random access memory (RAM) 254 is used to store the threshold values for 16 scan line segments. The RAM 254 is addressed by the output signals from a multiplexer circuit 256 which has an input signal value of zero on its B input and the output signals from a segment counter circuit 258 on its A input. The output signals from the counter circuit 252 are passed to the A inputs of multiplexer circuits 260 and 262 which have input signals equal to seven on their B inputs. Output signals from the multiplexer 260 are passed to an average AVG latch circuit 264 while output signals from the multiplexer circuit 262 are passed to the data inputs of the RAM 254.

Since the sixteen segments S0–S15 of the first scan line are arbitrarily assigned a threshold value of seven, the sixteen locations of the RAM 254 must initially be set to a value of seven. This is accomplished by the threshold calculation control circuit 220 by selecting the B input signals of the multiplexer 262 to be passed to the data inputs of the RAM 254, selecting the A inputs of the multiplexer 256 to address the random access memory 254, incrementing the segment counter 258 as the first scan line is received to address the sixteen locations of the RAM 254 and writing the value seven into the addressed locations.

For the second and following scan lines, the threshold value of the first segment S0 is initially set to seven by means of selecting the B input of the multiplexer 260 and latching the output signals from the multiplexer 260 into the latch circuit 264. The segment counter 258 is then incremented to address the memory location of the RAM 254 corresponding to the second segment S1 of a scan line such that the threshold for the second segment S1 of the preceeding scan line is read from the RAM 254 and stored in a threshold T latch circuit 266.

The output signals from the latch circuits 264 and 266 are passed to an adder circuit 268 which sums the two values. Thus the output of the adder circuit 268 is the summation of the thresholds of the scan line segment S(X-1) immediately preceeding the scan line segment being processed and the corresponding scan line segment S'(X) of the preceding scan line, see FIG. 6. The output signals of the adder circuit 268 are divided by two by a divider circuit 270 to generate the average threshold value at its output.

The average threshold value at the output of the divider circuit 270 is loaded into the counter circuit 252 and passed to the negative input of the comparator circuit 250 and to the threshold calculation control circuit 220. If the estimated threshold $T_{EST}$ on the conductors 224 exceeds the average threshold $T_{AVG}$ at the output of the divider circuit 270, an up-count signal is provided to the counter circuit 252 on the conductor 272 and, if the estimated threshold $T_{EST}$ is below the average threshold $T_{AVG}$, a down-count signal is provided on the conductor 272 to the counter circuit 252.

If the estimated threshold $T_{EST}$ was either greater than or less than the average threshold $T_{AVG}$, the threshold calculation control circuit 220 provides a count signal on the conductor 274 to the counter circuit 252. If, on the other hand, the estimated threshold $T_{EST}$ is equal to the average threshold $T_{AVG}$ or no estimated threshold was formed as indicated by an estimated threshold signal of 15 (hexidecimal F) on the conductors 224, the count signal is not provided on the conductor 274.

At this time, the output signal from the counter circuit 252 corresponds to the threshold value for the second segment of the second scan line or the scan line then being processed and, hence, the A inputs of the multiplexer circuits 260 and 262 are selected. The output signals from the multiplexer circuit 260 are latched into the latch circuit 264 and the output signals from the multiplexer circuit 262 are written into the RAM 254 at the location corresponding to the second segment of a scan line.

Since the latch circuit 266 still contains the threshold value set for the second segment of the preceding scan line, this threshold can be utilized by thresholding circuitry of a duplicator system, such as the comparator 20 of the duplicator system of FIG. 1, while the RAM 254 is being updated to the threshold value for the second segment of the second scan line or the scan line which is then being processed.

As previously noted, the threshold value for the second segment S1 is also used for the first segment S0, the threshold of which was initially estimated to be seven. The threshold value determined for the second segment S1 is stored in the appropriate memory location of the RAM 254 by selecting the B input of the multiplexer 256 to address the first segment S0 storage location of the RAM 254 prior to processing the third segment S2 of the current scan line being processed.

The remaining segments of the second and subsequent scan lines are similarly processed except that the threshold value for the fifteenth segment S14 is also utilized for the sixteenth segment S15. After the threshold value for the fifteenth segment S14 is stored into the storage location corresponding to the fifteenth segment S14 of the RAM 254, it is also stored into the storage location of the RAM 254 corresponding to the sixteenth segment S15. The second storage of the threshold for segment S14 is accomplished by incrementing the segment counter 258 to address the storage location of the RAM 254 corresponding to the sixteenth segment S15 after the threshold value for the fifteenth segment S14 has been determined and stored.

The threshold controller 200 can be implemented in a variety of hardware configurations as will be apparent to those skilled in the art. However, the threshold controller 200 is preferably implemented by means of one or more state controllers programmed to perform the described operations for generating the adaptive threshold in accordance with the present invention.

Figure 11:
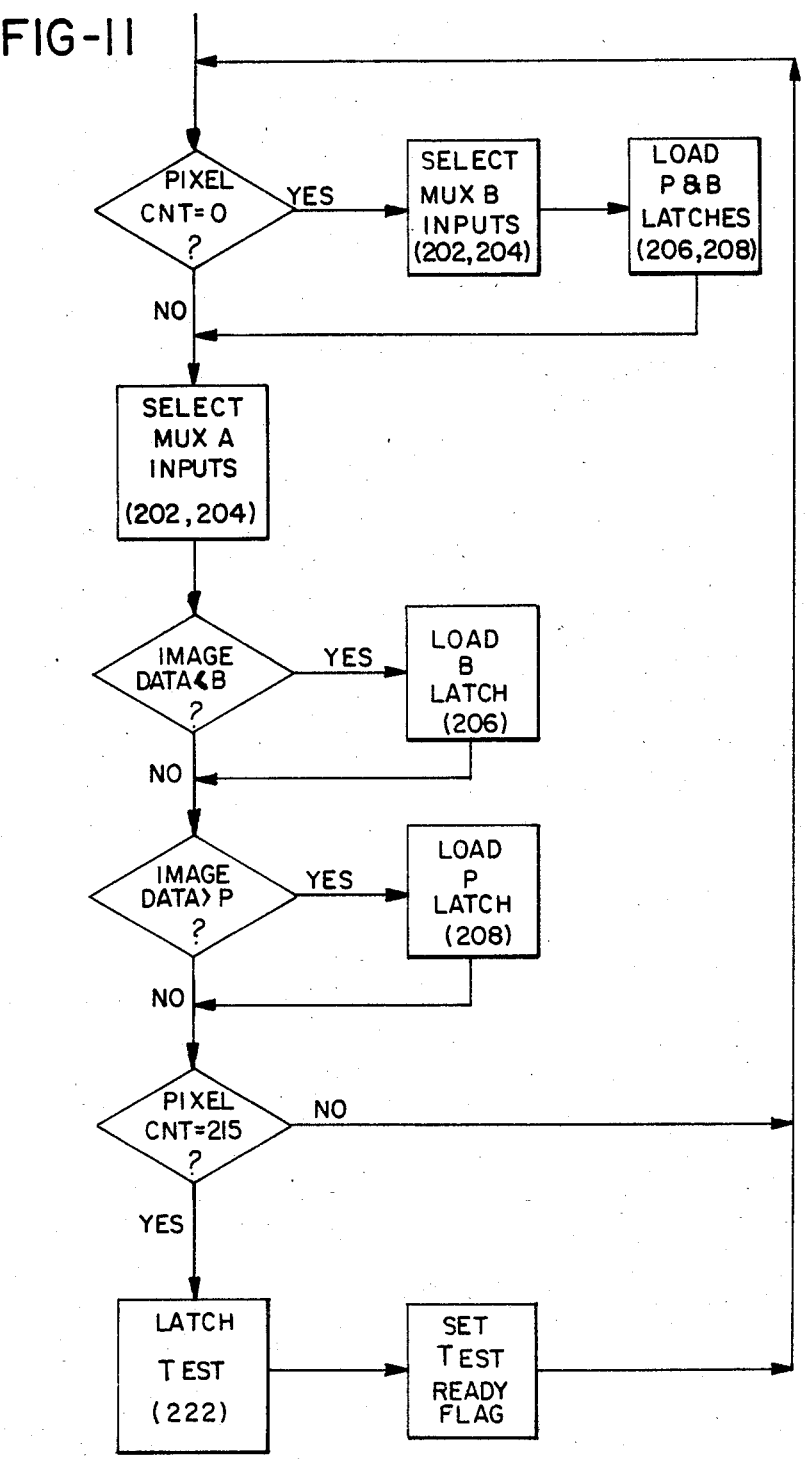
FIGS. 11 and 12 are flow charts showing steps for operating the circuitry of FIGS. 9 and 10.
Figure 12:
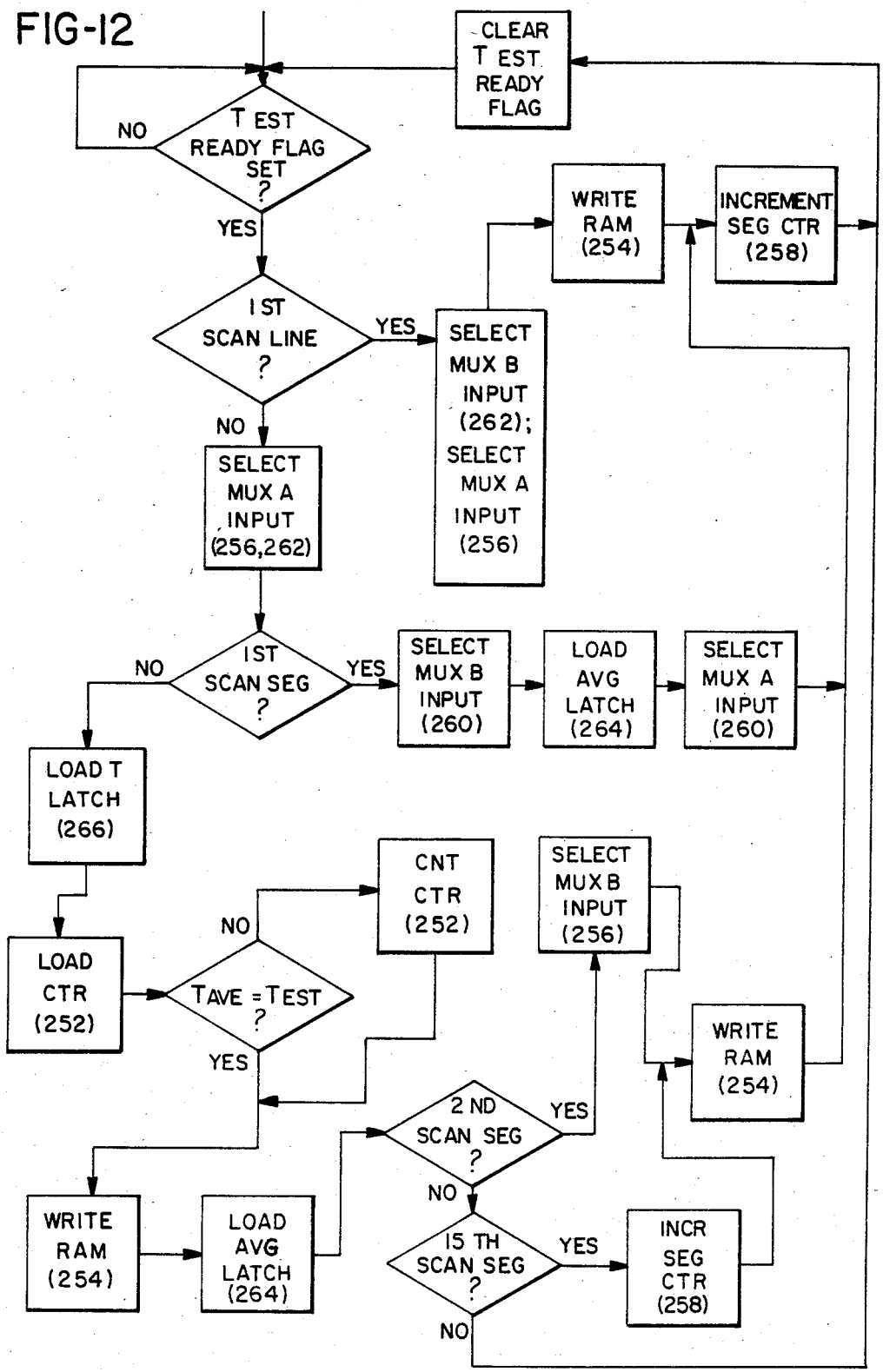

The flow charts included herein as FIGS. 11 and 12 will permit one skilled in the art of computer programming to readily implement a state machine for controlling the circuitry of FIGS. 9 and 10, respectively. The flow charts are generally applicable regardless of the circuit chosen to implement the present invention.

While the method herein described and the form of apparatus for carrying this method into effect constitute preferred embodiments of this invention, it is to be understood that the invention is not limited to this precise method and form of apparatus and that changes may be made in either without departing from the scope of the invention which is defined in the appended claims.

What is claimed is:

1. A method for duplicating a document wherein grayscale image data are compared to a threshold to convert said grayscale image data to binary image data suitable for use in a bilevel printing device, said method comprising the steps of:

scanning a document to generate grayscale image data representative of individual pixels of said document;

dividing said grayscale image data into image data groups each corresponding to a plurality of said pixels;

calculating estimated thresholds for each of said image data groups based on the grayscale values of the pixels within said groups;

calculating average thresholds for the areas of said image data groups by averaging the thresholds for groups contiguous to said groups for which thresholds have been previously established;

setting adaptive thresholds for said image data groups within a defined band surrounding said average thresholds by comparing said estimated thresholds to said average thresholds;

comparing said grayscale image data to said adaptive thresholds to generate binary image data; and printing a duplicate of said document based on said binary image data.

2. A method for duplicating a document as claimed in claim 1 wherein the step of calculating the image data group estimated thresholds comprises the steps of:

determining a background grayscale value for each of said image data groups;

determining a print grayscale value for each of said image data groups;

subtracting the background grayscale values from the print grayscale values to obtain contrast grayscale values for each of said image data groups; and adding a defined fractional portion of the corresponding contrast grayscale value to the corresponding background grayscale value to calculate said estimated thresholds for each of said image data groups.

3. A method for duplicating a document as claimed in claim 2 wherein the step of determining a background grayscale value for each of said image data groups comprises the steps of:

storing a maximum background grayscale value;

comparing the grayscale value of each element of an image data group to the stored background grayscale value; and updating the stored background grayscale value to the grayscale value of an element of said group if the grayscale value of the element is less than the currently stored background grayscale value.

4. A method for duplicating a document as claimed in claim 3 wherein the step of determining a print grayscale value for each of said image data groups comprises the steps of:

storing a minimum print grayscale value;

comparing the grayscale value of each element of an image data group to the stored print grayscale value; and updating the stored print grayscale value to the grayscale value of an element of said group if the grayscale value of the element exceeds the currently stored print grayscale value.

5. A method for duplicating a document as claimed in claim 4 wherein said estimated threshold equals the sum of the background grayscale value with 0.4 of the contrast grayscale value for each image data group.

6. A method for duplicating a document as claimed in claim 5 wherein said image data is organized as a matrix with each row of said matrix being divided into a plurality of segments, said image data groups corresponding to said segments.

7. A method for duplicating a document as claimed in claim 6 wherein the adaptive threshold is determined within said defined band by setting the adaptive threshold for each image data group: to the average threshold +1 if the estimated threshold exceeds the average threshold; to the average threshold −1 if the estimated threshold is less than the average threshold; and, to the average threshold otherwise.

8. Apparatus for duplicating a document wherein grayscale image data are compared to a threshold to convert said grayscale image data to binary image data suitable for use in a bilevel printing device, said apparatus comprising:

scanner means for generating grayscale image data representative of individual pixels of said document;

group identifier means connected to said scanner means for dividing said grayscale image data into image data groups each corresponding to a plurality of pixels;

threshold estimator means connected to said group identifier means for calculating an estimated threshold for each of said image data groups based on the grayscale values of the pixels within said groups;

threshold average means connected to said group identifier means for calculating an average threshold for the areas of each of said image data groups by averaging the thresholds for groups contiguous to said groups for which thresholds have been previously established;

threshold determining means connected to said threshold estimator means and said threshold average means for setting adaptive thresholds for said image data groups within a defined band surrounding said average thresholds by comparing said estimated thresholds to said average thresholds;

comparator means connected to said threshold determining means for comparing said grayscale image data to said adaptive thresholds to generate binary image data; and printer means connected to said comparator means and responsive to said binary data for printing a substantial duplicate of said document.

9. Apparatus for duplicating a document as claimed in claim 8 wherein said threshold estimator means comprises:

background means for determining a background grayscale value for each of said image data groups;

print means for determining a print grayscale value for each of said image data groups; and signal processing means connected to said background means and said print means for generating said estimated threshold by subtracting said background grayscale value from said print grayscale value to obtain a contrast grayscale value and adding a defined fractional portion of said contrast grayscale value to said background grayscale value to generate said estimated threshold.

10. Apparatus for duplicating a document as claimed in claim 9 wherein said background means comprises:

background storage means for storing a background grayscale value;

background comparator means for comparing the background grayscale value stored within said background storage means to the grayscale values of data words comprising said image data groups; and control means connected to said background storage means and to said background comparator means for initially storing a maximum grayscale value into said background storage means and thereafter updating the grayscale value stored therein to the grayscale value of a data word within one of said image data groups if said data word grayscale value is less than the grayscale value stored in said background storage means.

11. Apparatus for duplicating a document as claimed in claim 10 wherein said print means comprises:

print storage means for storing a print grayscale value; and print comparator means for comparing the print grayscale value stored within said print storage means to the grayscale values of data words comprising said image data groups, said control means connected to said print storage means and said print comparator means and further providing for initially storing a minimum grayscale value into said print storage means and thereafter updating the grayscale value stored therein to the grayscale value of a data word within one of said image data groups if said data word grayscale value is greater than the grayscale value stored in said print storage means.

12. Apparatus for duplicating a document as claimed in claim 11 wherein said signal processing means comprises a programmable read-only memory.

* * * * *